Figure 1:
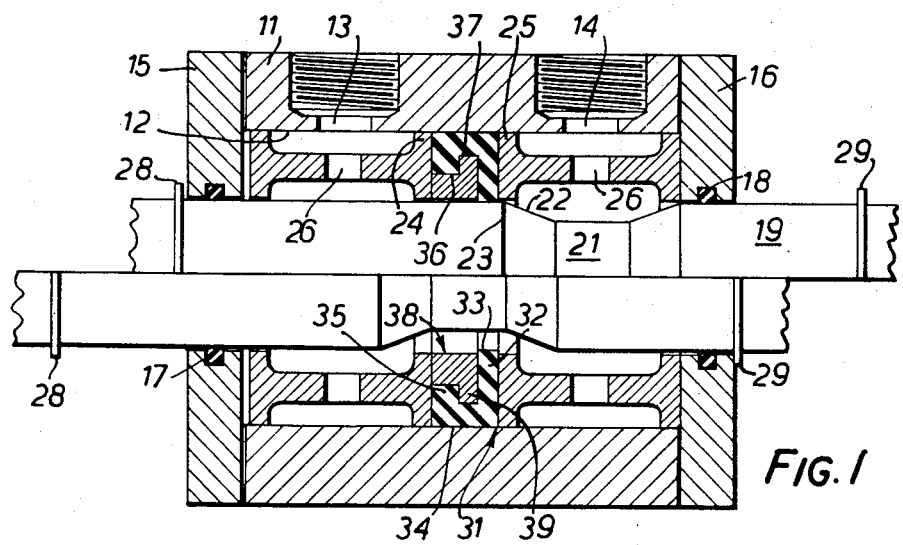

United States Patent [19]

Underwood

[11] 3,709,507
[45] Jan. 9, 1973

[54] FLUID SEALING DEVICES
[75] Inventor: Cyril James Underwood, Coberley, England
[73] Assignee: Dowty Seals Limited, Tewkesbury, Gloucestershire, England
[22] Filed: Dec. 3, 1970
[21] Appl. No.: 94,792

[30] Foreign Application Priority Data
Dec. 18, 1969 Great Britain.....................61,852/69

[52] U.S. Cl. ..................277/188, 277/194, 251/358, 251/324
[51] Int. Cl..............................................F16k 3/24
[58] Field of Search..............251/361, 363, 358, 324; 277/188, 178, 194, 193

[56] References Cited

UNITED STATES PATENTS 3,134,601   5/1964   Hager..............................277/193 X
2,823,058   2/1958   Ecker et al. .......................277/188 X
3,081,061   3/1963   Conrad............................251/358 X
2,970,871   2/1961   Flick................................277/188 X
2,661,182   12/1953  Kipp..............................251/DIG. 1

Primary Examiner—Arnold Rosenthal
Attorney—Young & Thompson

[57] ABSTRACT

A sealing device suitable for use in a control valve which has a slidable valve member with a greater diameter portion engageable within the sealing device to close a valve passage, wherein the sealing device includes a resilient sealing ring and a supporting ring which interlock. The sealing ring has a radially-extending portion providing an inner sealing face which is engageable by the valve member, and an axially-extending portion which is engageable within the body of the control valve. The supporting ring is disposed radially within the axially-extending portion and on one side of the radially-extending portion.

3 Claims, 3 Drawing Figures

PATENTED JAN 9 1973　　　　　　　　　　　　　　　3,709,507

INVENTOR
CYRIL JAMES UNDERWOOD
BY Young & Thompson
ATTORNEYS

FLUID SEALING DEVICES

This invention relates to sealing devices suitable for use in fluid flow control valves, and also to fluid flow control valves incorporating such sealing devices.

According to the present invention a sealing device comprises a sealing ring of resilient material having a radially-extending portion and an axially-extending portion, the radially-extending portion providing an inner sealing face, and the radially and axially extending portions providing an outer sealing face, and a supporting ring of a material harder than that of the sealing ring, the supporting ring being disposed radially within the axially extending portion and on one side of the radially-extending portion, and having an interface with said portions which is shaped to provide interlocking engagement with the sealing ring.

Sealing devices in accordance with the present invention are suitable for use in fluid flow control valves of the kind in which a spool type of valve member has portions of greater and lesser diameter which cooperate with a sealing device respectively to close and to open a fluid flow connection across the sealing device.

Figures 2, 3:
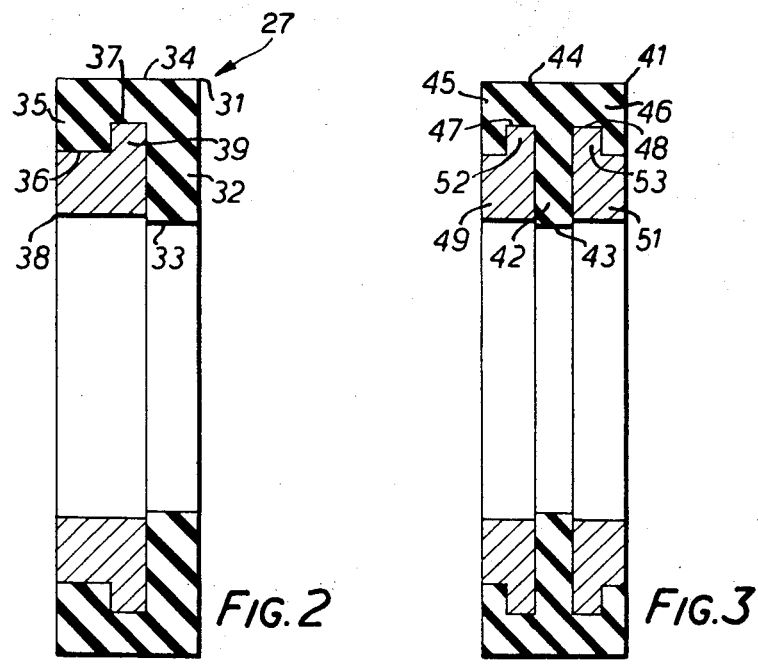

The invention is illustrated in the accompanying drawings, of which:

FIG. 1 is a longitudinal sectional view of a fluid flow control valve, in which the parts above and below the horizontal midline show the movable valve member in different positions, FIG. 2 is a sectional view on an enlarged scale of the sealing device in FIG. 1, and FIG. 3 is a sectional view of an alternative form of sealing device.

The valve of FIG. 1 has a housing 11 formed with a bore 12, and two ports 13 and 14 which open into the bore at positions spaced apart along the axis of the bore. Covers 15 and 16 at opposite ends of the housing 11 have openings with recesses containing sealing rings 17 and 18 through which a movable valve member 19 is axially slidable. The valve member 19 is for the most part of a uniform greater diameter which fits the openings in the covers 15 and 16, but which is radially spaced from the bore 12. A portion 21 of a lesser diameter leads into a frusto-conical portion 22 which intersects the greater diameter portion at a circular edge 23. This edge may be somewhat rounded.

Two lantern rings 24,25 are mounted in the bore 12 adjacent the respective ports 13 and 14, these rings having radial orifices 26 therein. The lantern rings form spacers for locating a sealing device 27 in the bore 12 at a position between the ports 13 and 14. In the upper part of FIG. 1, the valve member 19 is retained by an end stop 28 against the cover 15, in a position in which the greater diameter portion of the valve member 19 engages the sealing device 27 whereby the ports 13 and 14 are isolated one from the other. In the lower part of FIG. 1, the valve member 19 is retained by an end stop 29 against the cover 16, in a position in which the lesser diameter portion 21 is radially spaced from the sealing device 27 to afford a connection between the ports 13 and 14.

The sealing device of FIG. 2 includes a resilient sealing ring 31 having a radially-extending portion 32 which provides an inner sealing face 33 engageable by the greater diameter portion of the valve member 19.

The sealing ring also includes an axially-extending portion 35 which, together with the radially-extending portion, provide an outer sealing face 34 for engagement with the bore 12. The axially-extending portion is inwardly defined by a cylindrical face 36 having an annular recess 37 therein. A supporting ring 38 of a material harder than that of the sealing ring 34 is received radially within the axially-extending portion and on one side of the radially-extending portion of the sealing ring 31. The supporting ring 38 fits the cylindrical face 36 and it is formed with a flange 39 which fits the annular recess 37, and it also engages one side of the radially-extending portion in a transverse mating plane. The supporting ring thus has an interface with the portions 32 and 35 which provides interlocking engagement with the sealing ring.

The sealing device is assembled by springing the sealing ring 31 on to the supporting ring 38. The assembled sealing device has a substantially square cross section. The axial length of the supporting ring 38 exceeds the axial length of the radially-extending portion 32 of the sealing ring 31. The axial length of the radially-extending portion is small compared with the radial width.

The bore of the supporting ring 38 provides a clearance fit for the valve member 19, but the radially-extending portion 32 projects slightly inwardly from this bore in its free state whereby it is compressed by the greater diameter portion of the valve member 19 when installed in the valve.

The valve is operable with the higher fluid pressure in either the port 13 or the port 14. If the higher pressure is in the port 14, the fluid pressure will case the sealing device 27 to engage the lantern ring 24, and the latter to engage the cover 15. If the valve member 19 is moved towards the left, contact is maintained between the inner surface 33 of the sealing ring 31 and that part of the frusto-conical surface 22 which is close to the circular edge 23, due to the installation compression of the sealing material and to the action of fluid pressure. However, radial inward movement of the surface 33 is limited by the supporting ring 38 and by the small axial length of the radially-extending portion 32, whereby separation from the frusto-conical surface 22 readily occurs as the lesser diameter portion 21 moves towards the sealing device. Fluid is then enabled to flow from the port 14 to the port 13, and the restriction to flow is at a minimum when the lesser-diameter portion 21 lies in register with the sealing device, as shown in the lower part of FIG. 1.

When the valve member 19 is moved towards the right, the ports 13 and 14 are isolated one from the other when the edge 23 engages the inner surface 33. Any tendency for material at the radially inner part of the sealing ring 31 to become trapped under the inner surface of the lantern ring 25, during final closing movement of the valve, is reduced by the limitation of inward movement of the surface 33 which is provided as previously described.

In the alternative form of sealing device shown in FIG. 3, a sealing ring 41 has a central portion 42 extending radially between an inner sealing face 43 and an outer sealing face 44, and oppositely directed axially-extending portions 45 and 46 both of which are outwardly defined by the outer sealing face 44. The inner surfaces of the portions 45 and 46 are formed with annular recesses 47 and 48 which receive in interlocking engagement the flanges 52 and 53 of supporting rings 49 and 51 respectively.

The sealing ring 31 or 41 may be of natural or synthetic rubber or like resilient material. Each supporting ring 38 or 49,51 is of harder material having little if any appreciable elasticity, and it may be of metal, or of a hard elastomeric material such as nylon or Delrin.

The invention may be applied to other forms of valve including more than two ports, and two or more sealing devices spaced apart by lantern rings or other spacers.

In valves having an assembly of spacers and one or more sealing devices located within a bore in the valve housing, the interlocking engagement of the resilient sealing ring with the supporting ring prevents displacement of the sealing ring, due to the collective effect of adverse dimensional tolerances, into a position in which it would malfunction.

I claim as my invention:

1. A sealing device comprising a sealing ring of resilient material having a radially extending portion and an axially extending portion; the radially extending portion being disposed in cross section wholly at right angles to said axially extending portion, terminating remotely from said axially extending portion in an innermost circumferential sealing face, and being of constant axial thickness; said radially extending and axially extending portions together providing an outer circumferential sealing face; said axially extending portion having an inner circumferential face of a substantially larger diameter than said innermost circumferential sealing face; an annular radially outwardly directed recess being formed, adjacent to said radially extending portion, in said inner circumferential face of said axially extending portion; and said device also including a supporting ring of a material which is harder than that of the sealing ring; said supporting ring being disposed radially within the axially extending portion and to one side of the radially extending portion, said supporting ring having a radially outwardly directed flange which is of the same radial depth and axial width as and closely fits in said annular recess whereby axial interlocking, and rigid assembly, of said sealing ring and said supporting ring is provided solely by engagement of said flange with said recess; the diameter of said inner circumferential sealing face being only sufficiently less in the free state of the sealing ring than the innermost diameter of said supporting ring for that face to have an interference, and thus fluid sealing, fit with respect to an associated member when that member is so positioned as to be in engagement with the sealing ring, while said supporting ring has a clearance fit with respect to that member.

2. A sealing device according to claim 1, wherein the assembled sealing ring and supporting ring have a substantially square cross-section, and the axial length of the supporting ring exceeds the axial length of the radially-extending portion of the sealing ring.

3. A sealing device according to claim 1, wherein the sealing ring has a further axially-extending portion on the opposite side of the radially-extending portion from the first-mentioned axially-extending portion, and wherein a further supporting ring is provided on said opposite side of the radially-extending portion.

* * * * *